United States Patent [19]

Derrico

[11] Patent Number: 4,672,912

[45] Date of Patent: Jun. 16, 1987

[54] VAPOR PHASE PROCESSING SYSTEM

[75] Inventor: Gerard G. Derrico, Maynard, Mass.

[73] Assignee: Dynapert-HTC Corporation, Farmington, Conn.

[21] Appl. No.: 874,740

[22] Filed: Jun. 16, 1986

[51] Int. Cl.<sup>4</sup> ............................................. B05C 11/02
[52] U.S. Cl. ...................................... 118/64; 118/423; 118/429
[58] Field of Search ...................... 118/64, 69, 65, 429, 118/61, 423; 34/76; 228/19, 37

[56] References Cited

U.S. PATENT DOCUMENTS 4,541,358  9/1985  Splgarelli et al. ................ 118/64 X Primary Examiner—John P. McIntosh
Attorney, Agent, or Firm—Spencer T. Smith

[57] ABSTRACT

A vessel contains a volume of solder and a volume of electronic liquid floats on the solder. A heater heats the electronic liquid to generate a zone of saturated vapor and to transfer heat to the solder across the interface therebetween. Hot saturated vapor is drawn downwardly through a manifold in the solder. To heat the solder, means for conveying work product to the saturated vapor zone, and molten solder is applied to work product which is conveyed through the saturated vapor zone.

6 Claims, 6 Drawing Figures

VAPOR PHASE PROCESSING SYSTEM

In a vapor phase processing system, a contained electronic fluid is heated by heaters located within the contained fluid to generate a zone of saturated vapor. Work product is delivered by a conveyor to the saturated vapor zone for processing. Where the work product is presented at a substantially horizontal orientation and includes through-hole devices, molten solder may be applied to the bottom surface of the work product by a suitable solder applicator. In such conventional systems, the solder is heated by heat transfer across solder/electronic liquid or solder/saturated vapor interfaces and is thereby maintained at the saturated vapor temperature.

In systems of this type, the volume of molten solder is substantial and as a result, start-up time for the system (the time it takes for the electronic liquid and solder to heat up) and the shut-down time for the system are substantial.

It is an object of the present invention to increase the productivity of such a system.

Other objects and advantages of the present invention will become apparent from the following portion of this specification and from the following drawings which illustrate in accordance with the mandate of the patent statutes a presently preferred embodiment incorporating the principles of the invention.

Referring to the drawings.

Figure 1:
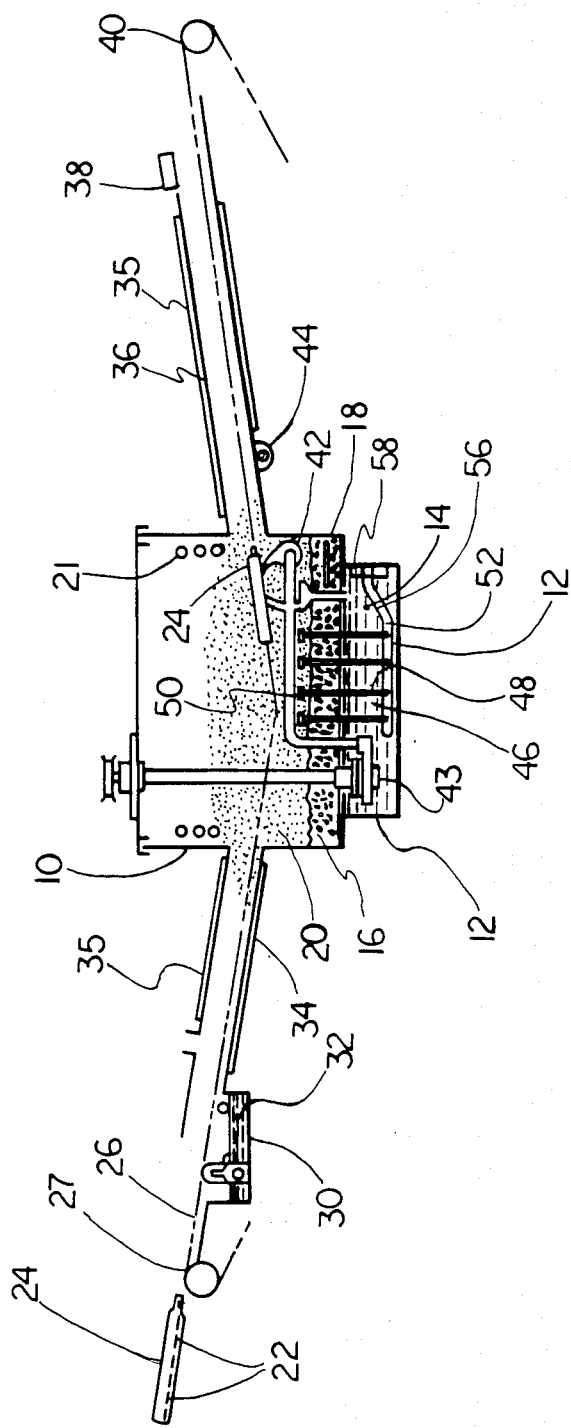
FIG. 1 is a schematic drawing of a vapor phase machine made in accordance with the teachings of the present invention.

The disclosed vapor phase processing system includes a tank 10 which has a sump 12 for containing solder 14. Electronic liquid 16 which is contained by the tank 10 and floats on the solder 14, is heated by immersion heaters 18 located within the electronic liquid to generate a zone 20 of saturated vapor. The height (h) of this zone 20 is controlled by cooling coils 21. Work product (here boards 22 mounted on a carrier 24) is loaded onto a conveyor 26 at a load position 27. The conveyor carries the work product over a foam fluxer 30 which applies flux 32 to the bottom surface of the boards 22, through the downwardly inclined inlet throat 34 which is cooled by conventional cooling structure 35 and into the saturated vapor zone 20 for processing. The processed boards 22 are then carried through the upwardly inclined cooled 35 exit throat 36 past cooling fans 38 to the product off-load location 40.

Figure 2:
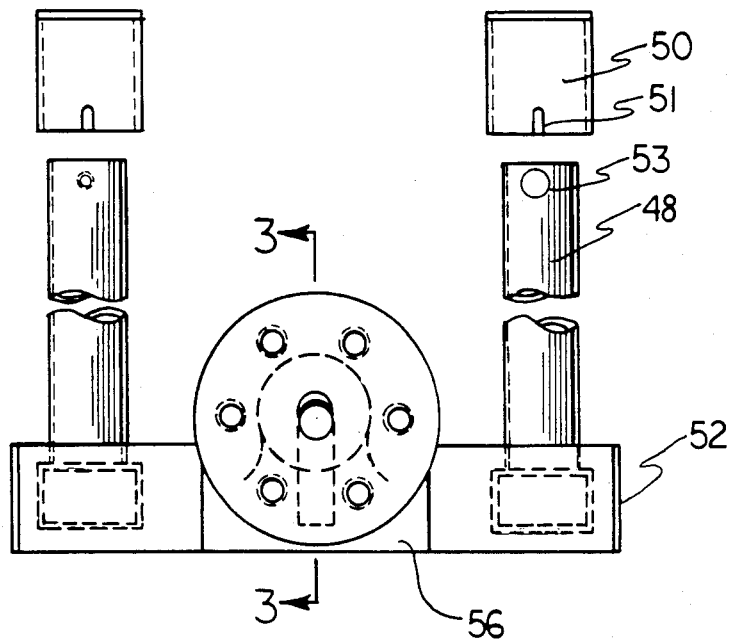
FIG. 2 is an end view of the heat transfer candle assembly illustrated schematically in FIG. 1.
Figure 3:
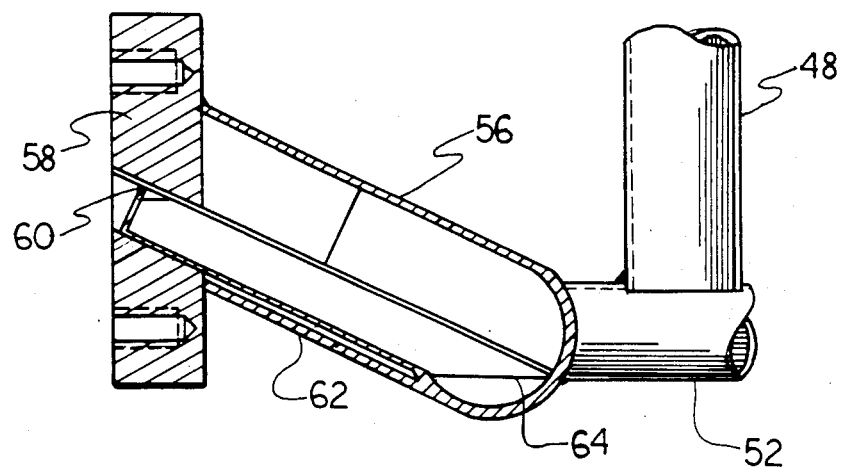
FIG. 3 is a view taken along FIGS. 3—3 of FIG. 2.

Molten solder 14 is applied to the fluxed bottom surface of the boards 22 by a solder applicator 42 which is supplied by a suitable pump 43 and excess molten solder is removed by a leveling or debridging nozzle 44 which directs streams of electronic liquid 16 against the soldered surface of the boards 22. The solder 14 will be maintained at the temperature of the electronic liquid 16 as a result of heat transfer across the electronic liquid/solder interface. To enhance heat transfer to and from the solder, a heat transfer candle assembly 46 is utilized. This assembly includes a plurality of hollow vertical candles 48 that are suitably capped by slightly oversized caps 50 to prevent the entry of anything but vapor. The candle caps 50 embody an adjusting slot 51 that permits up and down adjustment of each cap 50 with respect to its candle. (The cap is eccentrically secured to its candle by a suitable screw 53.) A downward adjustment of the cap 50 increases the resistance of the vapor or liquid flow. This feature provides a flow adjustment through each candle. The result is a balanced flow through the candle assembly. This permits uniform heating and cooling of the solder. These candles 48 communicate with a "U" shaped manifold 52 which includes a "T" portion 56 (FIGS. 2 and 3). This "T" is set at a slight incline and is connected to a mounting flange 58. An entry aperture 60 at this same angle is defined in the mounting flange 58 for receiving a small diameter tube 62. The tube 62 has its end cut to define a horizontal opening 64 proximate the bottom of the manifold.

Figure 4:
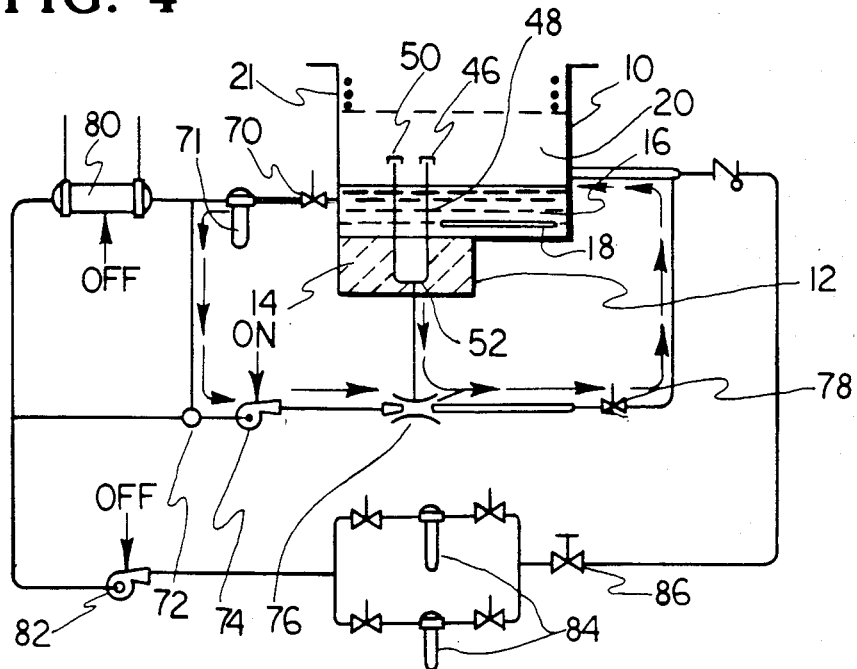
FIG. 4 is a schematic drawing illustrating the operation of the vapor phase machine during the heat-up cycle.

When the system is started up (see FIG. 4), the electronic liquid 16 is heated by the immersion heater 18 generating saturated vapor 20. Electronic liquid 16 is drawn from the tank 10 through a shut-off valve 70, a coarse screen filter and solder trap 71 and a three-way valve 72 by a motive pump 74. The pressurized electronic liquid drives a jet (venturi) pump 76 which communicates with the candle assembly manifold 52 thereby drawing hot saturated vapor from the saturated vapor zone 20 within the tank 10 into the candles 48 and through the manifold 52. Heat transfer to the solder accordingly takes place. When the solder is at a lower temperature, the saturated vapor will condense on the inside surface of the candles thereby rapidly transferring heat to the solder. As a result, the time it takes for the solder 14 to heat up to the desired temperature is greatly reduced from three to five hours to fifteen to twenty minutes. The condensed electronic liquid 16 with entrained hot saturated vapor from the saturated vapor zone 20 is directed through an open shut-off valve 78 back into the saturated vapor zone 20.

Figure 5:
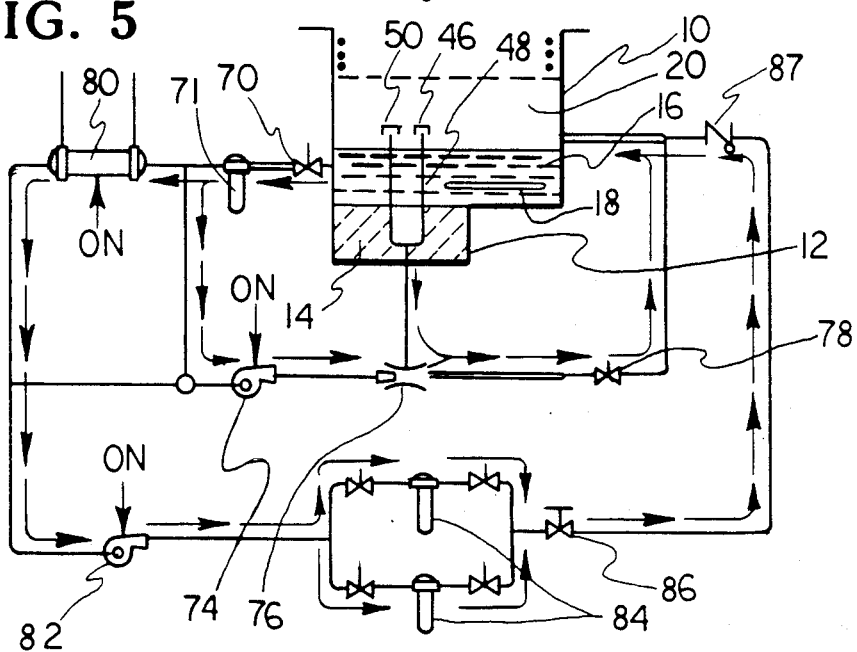
FIG. 5 is a schematic drawing illustrating the operation of the vapor phase machine during normal operation (the run cycle)

When start-up is complete and the machine is operational (FIG. 5), the heat exchanger 80 and filter pump 82 (which are off during the heat-up cycle) are turned on and electronic liquid 16 is also drawn through the heat exchanger and pumped through dual filters 84, flow control valve 86 and check valve 87, and returned to the saturated vapor zone 20.

Figure 6:
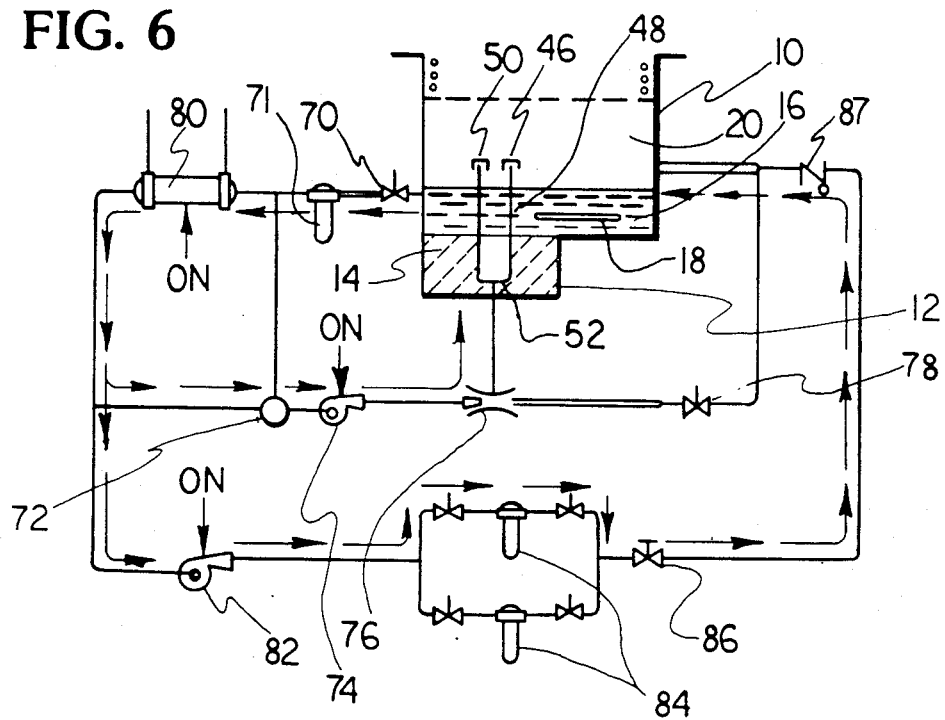
FIG. 6 is a schematic drawing illustrating the operation of the vapor phase machine during cool down cycle.

During the cool down cycle (FIG. 6), the shut-off valve 78 is closed and the three-way valve 72 is switched so that the motive pump 74 draws liquid from the heat exchanger 80 and directs the pressurized cooled liquid through the jet pump 76 into the manifold 52 and through the candles 48 into the vapor zone 20 within the tank 10. This effects a rapid cool down of the solder 14, saturated vapor zone 20 and electronic liquid 16 thereby maximizing the up time for the machine.

What is claimed is:

1. A vapor phase processing system comprising
   a vessel for containing a volume of solder with a volume of electronic liquid floating thereon,
   heater means for heating the electronic liquid to generate a zone of saturated vapor and to transfer heat to the solder across the interface therebetween, manifold means communicating with the hot saturated vapor above the electronic liquid and extending downwardly through the electronic liquid into the solder, means communicating with the bottom of said manifold means for drawing hot saturated vapor above the electronic liquid into said manifold means, means for conveying work product to the saturated vapor zone, and means for applying molten solder contained by said vessel to work product located within the saturated vapor zone.

2. A vapor phase processing system according to claim 1, wherein said manifold means comprises a plurality of vertically extending hollow candles communicating at the top thereof with the saturated vapor zone.

3. A vapor phase processing system according to claim 2, further comprising cap means located above the top opening of each of said hollow candles for preventing liquid from entering said hollow candles and means for varying the location of said caps to permit adjustment of flow through said hollow candles.

4. A vapor phase processing system according to claim 2, wherein said drawing means includes a jet pump operated in a first mode to draw the contents of said manifold means into the flow stream through said jet pump.

5. A vapor phase processing system according to claim 4, further comprising means for operating said jet pump in a second mode to direct the flow stream through said jet pump to said manifold means, and means for withdrawing electronic liquid from said vessel, lowering its temperature and directing this cooled electronic liquid to said jet pump whereby said cooled electronic liquid will be directed through said manifold means thereby cooling the contained solder.

6. A vapor phase processing system according to claim 5 wherein said withdrawing means comprises heat exchanger means, and motive pump means.

* * * * *